United States Patent [19]

Finberg et al.

[11] Patent Number: 5,705,544
[45] Date of Patent: Jan. 6, 1998

[54] FIRE-RETARDED PROPYLENE POLYMERS HAVING HIGH THERMOMECHANICAL STABILITY

[75] Inventors: Ita Finberg, Beer-Shev; Pierre Georlette, Omer, both of Israel

[73] Assignee: Bromine Compounds, Ltd., Beer-Sheva, Israel

[21] Appl. No.: 551,156

[22] Filed: Oct. 31, 1995

[30] Foreign Application Priority Data

Nov. 1, 1994 [IL] Israel .......... 111488

[51] Int. Cl.⁶ .......... C08K 5/15; C08K 5/3492
[52] U.S. Cl. .......... 524/100; 524/114; 524/412
[58] Field of Search .......... 524/114, 412, 524/100; 528/102; 549/559; 525/115, 120

[56] References Cited

U.S. PATENT DOCUMENTS

| | | | |
|---|---|---|---|
| 4,221,893 | 9/1980 | Behar et al. | 525/438 |
| 4,732,921 | 3/1988 | Hochberg et al. | 524/410 |
| 4,879,329 | 11/1989 | Hongo et al. | 524/114 |
| 5,187,212 | 2/1993 | Gray | 524/114 |
| 5,281,639 | 1/1994 | Satoh et al. | 524/114 |
| 5,336,735 | 8/1994 | Takahashi et al. | 524/114 |

FOREIGN PATENT DOCUMENTS 59-53524  3/1984  Japan .......... 524/114

OTHER PUBLICATIONS

Industrial Chemistry Library 7, *Advances in Organobromine Chemistry II* (1995) Elsevier Press.

Annual Book of Astm Standards vol. 08–01 (1993) pp. 569–572.

Hipol. Data Sheet —Mitsui Petrochemical, Publisher, Jan. 1989.

*Primary Examiner*—Veronica P. Hoke
*Attorney, Agent, or Firm*—Michael N. Meller

[57] ABSTRACT

A brominated epoxy oligomer of the formula

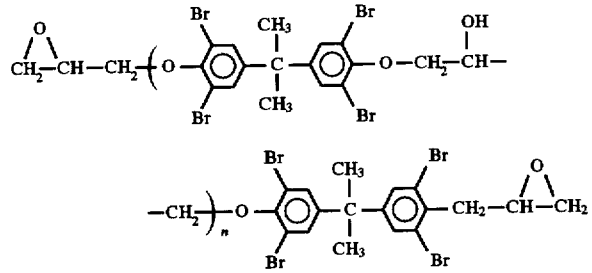

having a molecular weight of at least 3,000, useful as a flame retardant additive for polypropylene and ethylene propylene copolymers is described.

26 Claims, No Drawings

FIRE-RETARDED PROPYLENE POLYMERS HAVING HIGH THERMOMECHANICAL STABILITY

FIELD OF THE INVENTION

This invention relates to propylene polymer compositions, particularly based on polypropylene homopolymers or ethylene-propylene copolymers, having good flame retardancy and high thermomechanical stability, as measured by the heat distortion temperature, particularly compositions which contain brominated flame retardant additives.

BACKGROUND OF THE INVENTION

The expression "polypropylene polymers", when used hereinafter without further specification, comprises polypropylene and ethylene-propylene copolymers. Polypropylene and ethylene-propylene copolymers have low flame retardancy and in particular fall short of the high standards required in the electronic industry. For this reason, they must be compounded with high amounts of flame retardants (hereinafter also designated as "FR's"). However, the compositions of propylene polymers and flame retardants known in the art have considerable disadvantages, e.g., brittleness and poor mechanical properties, particularly when high amounts of flame retardants are required to impart the desired properties, and in particular, insufficient thermomechanical stability, as evidenced by a low heat distortion temperature under load (hereinafter HDT).

Flame retardancy can in principle be achieved in the art by the addition of brominated organic compounds. One of the most effective of such compounds known in the art is decabromodiphenyloxide (hereinafter Deca), but such an additive, even in combination with a synergist such as antimony trioxide, does not impart to polypropylene or propylene ethylene copolymers a high thermal mechanical stability.

It is a purpose of this invention to overcome the defects of previously known flame-retarded propylene polymer compositions.

More specifically, it is a purpose of this invention to provide propylons polymer compositions that have high flame retardancy and high heat distortion temperature under load.

It is another purpose of the invention to provide additives for propylons polymers that will provide high flame retardancy and a high thermal mechanical stability, and at the same time, involve no problem in compounding them with the base polymer and in working the compounded composition.

Other purposes and advantages of the invention will appear as the description proceeds.

SUMMARY OF THE INVENTION

The polypropylene and ethylene-propylene copolymer compositions, according to the invention, are characterized in that they contain as flame retardant a brominated epoxy oligomer having a molecular weight of at least 3,000. Preferably, the molecular weight should be from 6,000 to 70,000.

It should be understood that when a certain molecular weight of such an oligomer is specified hereinafter, it is not intended that it is its invariable and exact molecular weight, but rather that it is its approximate or average molecular weight, or what may be called its "nominal" molecular weight, viz. that indicated in its specifications by the manufacturer.

By "brominated epoxy oligomer" is meant herein a compound having the formula

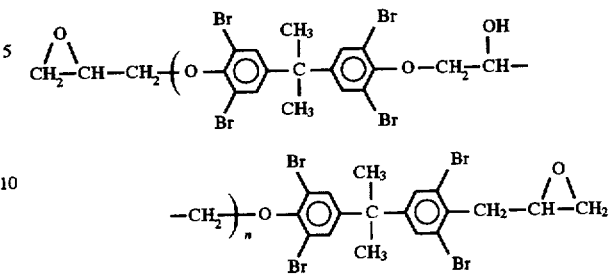

wherein N is between 3.9 and 115.37.

Such compounds are available on the market and are manufactured, for instance, by Dead Sea Bromine Group as a series of compounds under the collective designation F-2000. Their molecular weights range from 700 upwards. They are suggested as flame retardant additives for a number of plastics, but not for propylene polymers.

Preferably, the brominated epoxy oligomer is added in an amount ranging from 6% by weight to 70% by weight, and more preferably between 9 and 60% by weight. All percentages mentioned in this application are by weight, unless otherwise specified.

Other flame retardants may be further added, in a weight ratio to the polypropylene or ethylen-propylene copolymer preferably comprised between 0.5 and 55%, preferably from 1 to 25%. Such flame retardants may be chosen from among inorganic or organic flame retardants known in the art. Examples thereof are compounds of antimony, e.g. antimony trioxide or pentoxide, of tin, e.g. tin oxide or maleate, of magnesium, e.g. magnesium hydroxide or hydrotalcite, of aluminum, e.g. aluminum trihydrates, of iron, e.g. ferric oxide, or of bismuth; silicone systems; and organic flame retardants, such as organic compounds containing in their molecule bromine, chlorine, phosphorus, bromine and phosphorus, or melamine compounds, and their combinations.

Other additives, known in the art as additives for polymeric compositions, can also be added. Examples of such additives are reinforcing glass or carbon fibers, various fillers, stabilizers, lubricant processing aids, impact modifiers, pigments, compatibilizers, anti-dripping agents, etc.

While the invention is directed to compositions based on polypropylene or ethylene-propylene copolymers, such base polymers can be associated, in alloy-like mixtures, with other known polymers, such as polyethylene, polyamides, PBT/PET, fluorlasted homo- and copolymers, etc.

It has been found that brominated epoxy oligomers having molecular weight below 3,000 are not effective for the purposes of imparting flame retardancy to propylons polymers. In the first place, they have a poor compatibility with the polymers, as evidenced by the impossibility of processing the mixtures of propylene polymers and such low molecular weight brominated epoxy oligomers without phase separation of the components. Moreover, even when it is possible to overcome the processing difficulties, the resulting compositions have very low viscosity properties and are difficult to handle after molding.

Surprisingly, the brominated epoxy oligomers with a molecular weight of at least 3,000 are much easier to compound with the propylons polymers and to mold by injection. Moreover, the resulting compositions have better flame retardancy on a bromine basis than those containing commonly used FR additives of the prior art.

In view of the aforesaid surprising fact, the process of preparing a flame retarded propylene polymer composition which comprises compounding the propylene polymer with a brominated epoxy oligomer having a molecular weight of at least 3,000, and preferably 6,000 to 70,000, is also an aspect of this invention.

DETAILED DESCRIPTION OF PREFERRED EMBODIMENTS

The compositions of propylene polymer and brominated epoxy oligomer, described in the following examples and the properties of which are set forth in the following tables, were prepared by compounding a mixture of propylene polymer and brominated epoxy oligomer and pelletizing it in a Brabender twin-screw extruder heated with a temperature profile as follows: 150°–190°–210°–220° C. The granules obtained were injection molded in a press heated at 210°–230°–240°–235° C. to obtain samples for testing.

The brominated epoxy oligomers used were the following compounds of the F-2000 series produced by Dead Sea Bromine Group: F-2001, F-2016, F-2300 H and F-2400. Their molecular weights were respectively: 1000, 1600, 20,000 and 40,000.

Example 1

(Comparative)

Mixture of polypropylene with MFI 20 and brominated epoxy oligomers having a molecular weight of 1,000 and 1,600 were compounded and pelletized as hereinbefore described. The brominated epoxy with the molecular weight of 1,000 was impossible to process with the polypropylene and a strong phase separation was observed. The oligomer having the molecular weight 1,600 was difficult but possible to compound and mold, but a melt flow index of 850 was obtained, indicating that the mixture is very difficult to mold, and moreover, is difficult to handle after molding. The results are set forth in Table 1.

invention (columns 2,3 and 4) additionally comprise an inorganic FR additive, specifically antimony trioxide. For comparative purposes, a composition comprising Deca as flame retardant, also with antimony trioxide, was prepared (column 5), the amount of FR additive being such as to obtain a flame retardancy rating of UL-94 V-0. The brominated epoxy oligomer of column 2 had a molecular weight of 1,600 and the composition is the same as illustrated in the second column of Table 1 and has the same problems-Columns 3 and 4 illustrate the properties of compositions which have a molecular weight above 3,000, precisely 20,000 and 40,000 respectively. These compositions, as well as the comparative Deca flame retarded composition, contained approximately the same amount (12% or thereabout) of antimony trioxide. The first column of Table 21 sets forth, for reference purposes, the properties of polypropylene MFI 20 free from any FR additives. It is seen that the HDT of that polypropylene is 45° C. which is considered a low value, detrimental for application in the electronic industry. The addition of 24.1% of Deca and 12.2% of antimony trioxide provided the required flame retardancy, but did not substantially improve the thermomechanical properties, since the composition of column 5 has an HDT value of 59° C. Non-halogenated flame retardants, such as magnesium hydroxide, as shown in column 6, can provide the required flame retardancy, but only in very large amounts—about 65% in this case—and this has a negative influence on the properties of the compound. Further, despite the high level of magnesium hydroxide, the HDT value is 61° C., and this is still rather low.

The compositions illustrated in columns 8 and 4 were prepared with brominated epoxy oligomers having molecular weight 20,000 ( compound F-2300 H) and 40,000 (compound F-2400) respectively and have surprisingly high HDT values of more than 90° C. These values are even higher than those usually obtained with high impact polystyrene or ABS used in the electronic industry. The composition prepared with brominated epoxy oligomers of molecular weight 1,600 (compound F-2016), not only was hard to process, as set forth in Example 1, and only with difficulty yields samples for evaluation, but the HDT value is substantially lower than those obtained with the compositions according to the invention.

TABLE I

| Molecular weight of the brominated epoxy | 1000 | 1600 | Reference (No. FR) |
|---|---|---|---|
| Composition % | | | |
| Polypropylene MFI 20 (230 C.-2.16 Kg) | 88.5 | 46.1 | 100 |
| Brominated epoxy oligomer | 9 | 42 | |
| Antimony trioxide | 2.5 | 11.9 | |
| Compounding | not possible to mix because of phase separation Impossible to add more brominated epoxy | difficult to compound | OK |
| Injection molding | — | very difficult to mold | OK |
| Melt flow index (230 C., 2.16 Kg) | — | 350 | 20 |

Example 2

Compositions of polypropylene, flame retarded by means of various FR additives have been prepared as hereinbefore described, and their properties are set forth in Table 2. The compositions listed in said table that are according to the

TABLE II

| Composition no. | 1 | 2 | 3 | 4 | 5 | 6 |
|---|---|---|---|---|---|---|
| FR type | Reference (No. FR) | Br Epoxy MW 1,600 | Br Epoxy MW 20,000 | Br Epoxy MW 40,000 | DECA | Magnesium hydroxide Non-halogenated FR |
| Composition % | | | | | | |
| Polypropylene MFI 20 (230° C., 2.16 Kg.) | 100 | 46.1 | 48.7 | 52.4 | 63.7 | 35 |
| Flame retardant | | 42 | 40 | 36.3 | 24.1 | 65 |
| Antimony trioxide | | 11.9 | 11.3 | 11.3 | 12.2 | |
| Bromine content % | 0 | 21 | 20 | 18.5 | 20 | 0 |
| Flame retardancy: (UL94-3.2 mm) | | | | | | |
| Max. Flaming time. sec | | 1 | 0 | 9 | 3 | 3 |
| Total Flaming time. sec | | 1 | 0 | 17 | 17 | 18 |
| Dripping | | 0 | 0 | 0 | 0 | 0 |
| Rate | non-rated | V-0 | V-0 | V-0 | V-0 | V-0 |
| Impact notched IZOD, J/m | 18 | 15 | 24 | 13 | 20 | 11 |
| HDT, Celsius (1.8 MPa) | 53 | 63 | 97 | 96 | 59 | 61 |
| MFI, g/10 min (230 C., 2.16 Kg) | 20 | 350 | 41 | 27 | 23 | <5 |

Example 3

Compositions containing a brominated epoxy oligomer with a molecular weight of 40,000 (compound F-2400) have been prepared as hereinbefore described. Samples produced by injection molding have been tested, and HDT values obtained are set forth in Table. 3.

This example illustrates the surprising efficiency of the combination of brominated epoxy oligomers according to the invention and polypropylene to achieve high thermomechanical properties, evidenced by high HDT values. As a reference, column 7 in Table 3 refers to a composition of polypropylene reinforced with 20% of glass fiber and it is seen that the HDT obtained is only 93° C., while the invention permits to achieve an HDT above 100 without the addition of glass fibers.

TABLE III

| Composition no. | 1 | 2 | 3 | 4 | 5 | 6 | 7 |
|---|---|---|---|---|---|---|---|
| FR type | Reference (No. FR) | ← Brominated epoxy oligomer MW 40,000 → | | | | | Reference 20% glass fiber |
| Composition % | | | | | | | |
| Polypropylene MFI2 (230 C., 2.16 KG) | 100 | 58.6 | 52.5 | 46.3 | 40.2 | 34 | 80 |
| Flame retardant | | 31.4 | 36.3 | 41.2 | 46.1 | 51 | |
| Antimony trioxide | | 10 | 11.2 | 12.5 | 13.7 | 15 | |
| Glass fiber | | | | | | | 20 |
| Bromine content, % | 0 | 16 | 18.5 | 21 | 23.5 | 26 | 0 |
| HDT, Celsius (1.8 MPa) | 53 | 83 | 96 | 101 | 104 | 108 | 93 |

Example 4

In the compositions of this example, an ethylene-propylene copolymer, manufactured by BASF under the trade name Novolen 2600 TCX, has been compounded with brominated epoxy oligomers having a molecular weight of 40,000 (compound F 9.400) and, for reference purposes, with Deca. The results are tabulated in Table 4. It is seen that an HDT increase of more than 20° C. is obtained by using the brominated epoxy oligomer of the invention, while no increase is noticed with Deca.

TABLE IV

| Composition no. | 1 | 2 | 3 |
|---|---|---|---|
| FR type | Reference (No. FR) | Br. Epoxy MW 40,000 | DECA |
| Composition, % | | | |
| PP block copolymer (Novolen 2600 TCX BASF) | 100 | 58.6 | 69.7 |
| Flame retardant | | 31.4 | 23 |
| Antimony trioxide | | 10 | 7.3 |
| Bromine content, % | 0 | 18 | 18 |
| HDT, Celsius (1.8 MPa) | 48.8 | 69.1 | 48.5 |

Example 5

All the compositions described in the following table have been pelletized on a twin screw co-rotating extruder Berstorff with the following temperature profile:

60-175-185-194-210-223-225-230 degrees Celsius.

The speed of the screws was 350 rpm.

The granules obtained were molded by injection in an Allrounder Arburg press with the following conditions:

180-200-220-230 degree Celsius.

Table V below summarizes properties of molded parts:

TABLE V

Polypropylene flame retarded by Brominated epoxy oligomers
Influence of fillers and other flame retardants on heat distorsion temperature

| Type of additive | ←CaCO₃→ | | | ←Mg(OH)₂→ | | ←TALC→ | |
|---|---|---|---|---|---|---|---|
| Composition, % | | | | | | | |
| PP Hipol J400 (Mitsui) | 85 | 46.4 | 37.2 | 85 | 43.6 | 85 | 43.6 |
| Brominated epoxy oligomer Mw 30,000 (Dead Sea Bromine Group) | 0 | 29.3 | 35 | 0 | 31.4 | 0 | 31.4 |
| CaCO₃ Avgil 600 | 15 | 15 | 15 | | | | |
| Talc Extra 510 (Luzenac) | | | | | | 15 | 15 |
| Magnesium hydroxide FR-20 grade 640 (Dead Sea Bromine Group) | | | | 15 | 15 | | |
| Antimony trioxide (Amspec) | 0 | 9.3 | 12.8 | 0 | 10 | 0 | 10 |
| Properties: | | | | | | | |
| Flame Retardancy UL 94 (3.2 mm) Rate | NR | V-2 | V-2 | NR | V-1 | NR | V-0 |
| Heat Distorsion Temperature: 1.8 Mpa degree Celsius | 59 | 91 | 93 | 51 | 90 | 63 | 99 |

The results in Table V illustrate the surprising efficiency of brominated epoxy oligomers with a molecular weight according to the invention to increase dramatically heat distortion temperatures of polypropylene compounds even if they are filled with calcium carbonate, magnesium hydroxide or talc. The table also illustrates the flame retardancy properties of the compounds containing the brominated epoxy oligomers. NR states that the compounds without brominated epoxy oligomers are Not Rated and consequently do not pass the UL 94 standard under these conditions.

While, embodiments of the invention have been described by way of illustration, it will be apparent that the invention can be carried out by persons skilled in the art with many modifications, variations and adaptations, without departing from its spirit or exceeding the scope of the claims.

We claim:

1. A flame retarded propylene polymer composition comprising polypropylene or an ethylene-propylene copolymer and, as a flame retardant additive, a brominated epoxy oligomer of the formula

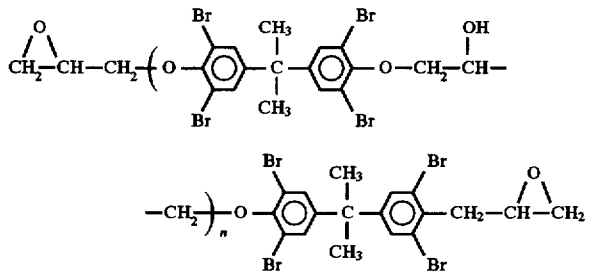

having a molecular weight of greater than 3,000 and up to about 70,000 and wherein n is between about 3.9 and about 115.37.

2. A composition according to claim 1, further comprising one or more additional flame retardant additives.

3. A composition according to claim 2, wherein the additional flame retardant additive is (1) an organic compound selected from the group of compounds of antimony tin, magnesium, aluminum, iron, and bismuth; (2) silicones or (3) organic flame retardants.

4. A composition according to claim 2, wherein the additional flame retardant additive is (1) an inorganic compound selected from the group consisting of antimony trioxide, antimony pentoxide, tin oxide, tin, maleate, magnesium hydroxide, magnesium hydrotalcite, aluminum trihydrates, ferric oxide, (2) an organic compound selected from the group consisting of melamine compounds and those containing in their molecule bromine, chlorine, phosphorus, or bromine and phosphorus, or (3) combinations of any of said additives.

5. A composition according to claim 1, wherein the weight ratio of the brominated epoxy oligomer to the polypropylene or ethylene-propylene copolymer is between 6 and 70%.

6. A composition according to claim 1, wherein the weight ratio of the brominated epoxy oligomer to the polypropylene or ethylene-propyleno copolymer is between 9 and 60%.

7. A composition according to claim 1, wherein the weight ratio of the additional flame retardant to the polypropylene or ethylene-propylene copolymer is between 0.5 and 55%.

8. A composition according to claim 1, further comprising at least an additional polymer.

9. A composition according to claim 8, wherein the additional polymer is selected from the group consisting of polyethylene, polyamides, polybutylene terephthalate or polyethylene terephthalate, and fluorinated homo- and copolymers.

10. A composition according to claim 1, further comprising additional additives wherein the additional additives are selected from the group consisting of reinforcing glass or carbon fibers, fillers, stabilizers, lubricant processing aids, impact modifiers, pigments, compatibilizers and anti-dripping agents.

11. Process for the preparation of a flame-retarded polypropylene or ethylene-propylene copolymer composition, comprising compounding the polypropylene or ethylene-propylene copolymer with a brominated epoxy oligomer as defined in claim 1.

12. A flame retarded propylene polymer composition according to claim 1 wherein said brominated epoxy oligomer has a molecular weight from about 6,000 to about 70,000.

13. A composition according to claim 12, further comprising one or more additional flame retardant additives.

9

14. A composition according to claim 12, wherein the additional flame retardant additive is an inorganic compound which are (1) selected from the group of compounds of antimony tin, magnesium, aluminum, iron, and bismuth; (2) silicones being silicone compounds; or (3) organic flame retardants.

15. A composition according to claim 13, wherein the additional flame retardant additive is (1) an organic compound selected from the group consisting of antimony trioxide, antimony pentoxide, tin oxide, tin maleate, magnesium hydroxide, magnesium hydrotalcite, aluminum trihydrates, and ferric oxide (2) organic compounds selected from the group consisting of melamine compounds and those containing in their molecule bromine, chlorine, phosphorus, or bromine and phosphorus, or (3) combinations of any of said additives.

16. A composition according to claim 12, wherein the weight ratio of the brominated epoxy oligomer to the polypropylene or ethylene-propylene copolymer is between 6 and 70%.

17. A composition according to claim 12, wherein the weight ratio of the brominated epoxy oligomer to the polypropylene or ethylene-propylene copolymer is between 9 and 60%.

18. A composition according to claim 12, wherein the weight ratio of the brominated epoxy oligomer to the polypropylene or ethylene-propylene copolymer is between 0.5 and 55%.

19. A composition according to claim 12, further comprising at least an additional polymer.

20. A composition according to claim 19, wherein the additional polymer is selected from the group consisting of polyethylene, polyamides, polybutylene terephthalate or polyethylene terephthalate, and fluorinated homo- and copolymers.

21. A composition according to claim 12, further comprising additional additives, wherein the additional additives are selected from the group consisting of reinforcing glass or carbon fibers, fillers, stabilizers, lubricant processing aids, impact modifiers, pigments, compatibilizers and anti-dripping agents.

22. A process for preparing a flame retarded propylene polymer composition comprising polypropylene or an ethylene-propylene copolymer which comprises compounding the polypropylene or ethylene-propylene copolymer with a flame retardant additive wherein a brominated epoxy oligomer of the formula

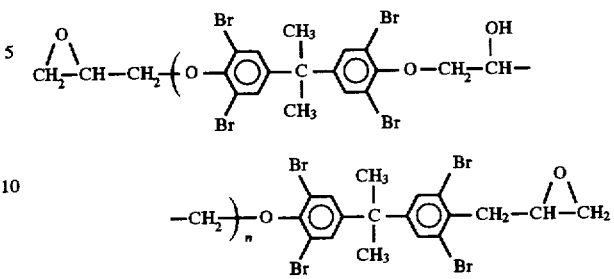

having a molecular weight of greater than 3,000 and up to about 70,000 and wherein n is between about 3.9 and about 115.37, is used as the flame retardant additive.

23. A process according to claim 22 wherein an additional flame retardant additive is included in the composition which comprises (1) an inorganic compound selected from the group consisting of compounds of antimony, tin, magnesium, aluminum, iron and bismuth; (2) silicones, or (3) organic flame retardants.

24. A process according to claim 23, wherein the additional flame retardant additives is (1) an inorganic compound selected from the group consisting of antimony trioxide, antimony pentoxide, tin oxide, tin maleate, magnesium hydroxide, magnesium hydrotalcite, aluminum trihydrates, and ferric oxide, (2) organic compounds selected from the group consisting of melamine compounds and those containing in their molecule bromine, chlorine, phosphorus, or bromine and phosphorus, or (3) combinations of any of said additives.

25. A process according to claim 22 which comprises an additional polymer wherein the additional polymer is selected from the group consisting of polyethylene, polyamides, polybutylene terephthalate or polybutylene terephthalate, and fluorinated homo- and copolymers.

26. A process according to claim 22 further comprising additional additives wherein the additional additives are selected from the group consisting of reinforcing glass or carbon fibers, fillers, stabilizers and anti-dripping agents.

* * * * *